US006976071B1

(12) United States Patent
Donzis et al.

(10) Patent No.: US 6,976,071 B1
(45) Date of Patent: Dec. 13, 2005

(54) DETECTING IF A SECURE LINK IS ALIVE

(75) Inventors: Lewis T. Donzis, San Antonio, TX (US); Earnest E. Hughes, San Antonio, TX (US); Ryan M. Matelske, San Antonio, TX (US); Peter W. Baron, San Antonio, TX (US)

(73) Assignee: Nortel Networks Limited, St. Laurent (CA)

( * ) Notice: Subject to any disclaimer, the term of this patent is extended or adjusted under 35 U.S.C. 154(b) by 703 days.

(21) Appl. No.: 09/714,082

(22) Filed: Nov. 16, 2000

Related U.S. Application Data

(60) Provisional application No. 60/201,443, filed on May 3, 2000.

(51) Int. Cl.$^7$ .................. G06F 15/173; G06F 15/16; G06F 11/30

(52) U.S. Cl. .................. 709/224; 709/227; 713/201

(58) Field of Search .................. 709/227, 224; 713/201

(56) References Cited

U.S. PATENT DOCUMENTS

| | | | | |
|---|---|---|---|---|
| 5,828,833 | A | * | 10/1998 | Belville et al. ............. 713/201 |
| 5,864,666 | A | * | 1/1999 | Shrader ..................... 713/201 |
| 6,073,172 | A | * | 6/2000 | Frailong et al. ............ 709/222 |
| 6,079,020 | A | * | 6/2000 | Liu ........................... 713/201 |
| 6,173,411 | B1 | * | 1/2001 | Hirst et al. ................. 714/4 |
| 6,182,226 | B1 | * | 1/2001 | Reid et al. ................. 713/201 |
| 6,360,269 | B1 | * | 3/2002 | Mamros et al. ............. 709/228 |
| 6,392,990 | B1 | * | 5/2002 | Tosey et al. ................ 370/218 |
| 6,473,798 | B1 | * | 10/2002 | Grosser et al. ............. 709/224 |
| 6,636,898 | B1 | * | 10/2003 | Ludovici et al. ............ 709/250 |

OTHER PUBLICATIONS

"Introduction to Internet"—Originally cited in the Applicant's Remarks submitted Nov. 10, 2004. Also cited by Examiner in the response to arguments. Was not forwarded to the Examiner with the amendment so it is being made part of the record.*
"Layer 2 Tunneling Protocol (L2TP) Overview" by the IBM Corporation, 1999, as printed from www-1.ibm.com/servers/eserver/iseries/tcpip/vpn/redbooks/l2tppres/pdf/l2tppres.pdf.*
"Securing L2TP using IPSEC" Internet-Draft, Oct. 1999, Internet-Draft for RFC 3193 <draft-ietf-pppext-l2tp-security-05.txt.*
Kessler et al., RFC 2151 "A Primer on Internet and TCP/IP Tools and Utilities", Jun. 1997.*
S. Deering et. al., Request for Comments: 2460, *Internet Protocol, Version 6 (IPv6) Specification*, pp. 1-39 (Dec. 1998).
J. Postel, Request for Comments: 768, *User Datagram Protocol*, pp. 1-3 (Aug. 1980).
W. Simpson, Request for Comments: 1661, *The Point-To-Point Protocol (PPP)*, pp. 1-47 (Jul. 1994).

(Continued)

*Primary Examiner*—Saleh Najjar
*Assistant Examiner*—David Lazaro
(74) *Attorney, Agent, or Firm*—Trop, Pruner & Hu, PC

(57) ABSTRACT

A communication system includes a data network that is coupled to various nodes, including routers. In one example arrangement, a first router is part of a first local network and a second router is part of a second local network. Each router includes a security gateway module and a keep-alive module. The security gateway module is capable of establishing a secure link, such as one according to an Internet Protocol Security (IPsec) protocol, over the data network. The keep-alive module sends one or more ping messages over the secure link to the remote router (or a node coupled to the router), which responds with appropriate ping replies to indicate that a link is alive.

27 Claims, 7 Drawing Sheets

OTHER PUBLICATIONS

G. McGregor, Request for Comments: 1332, *The PPP Internet Protocol Control Protocol (IPCP)*, pp. 1-13 (May 1992).

R. Droms, Request for Comments: 1541, *Dynamic Host Configuration Protocol*, pp. 1-35 (Oct. 1993).

S. Kent et al., Request for Comments: 2406, *IP Encapsulating Security Payload (ESP)*, pp. 1-20 (Nov. 1998).

D. Maughan, et al., Request for Comments: 2408, *Internet Security Association and Key Management Protocol (ISAKMP)*, pp. 1-76 (Nov. 1998).

Information Sciences Institute, Request for Comments: 791, *Internet Protocol, Darpa Internet Program Protocol Specification*, pp. 1-46 (Sep. 1981).

S. Kent, Request for Comments: 2401, *Security Architecture for The Internet Protocol*, pp. 1-58 (Nov. 1998).

J. Postel, Request for Comments: 792, *Internet Control Message Protocol, Darpa Internet Program Protocol Specification*, pp. 1-20 (Sep. 1981).

Information Sciences Institute, Request for Comments: 793, *Transmission Control Protocol, Darpa Internet Program Protocol Specification*, pp. 1-82 (Sep. 1981).

W. Townsley et al., Request for Comments: 2661, *Layer Two Tunneling Protocol "L2TP"*, pp. 1-71 (Aug. 1999).

\* cited by examiner

DETECTING IF A SECURE LINK IS ALIVE

CROSS-REFERENCE TO RELATED APPLICATION

This application claims the benefit under 35 U.S.C. § 119(e) of U.S. Provisional Application Ser. No. 60/201,443, entitled "Virtual Private Network Keep-Alive Mechanism," filed May 3, 2000.

TECHNICAL FIELD

This invention relates to detecting if a secure link between network nodes is alive.

BACKGROUND

Many types of communications are possible over data networks, including electronic mail, web browsing, file downloads, electronic commerce transactions, voice or other forms of real-time, interactive communications, and so forth. Networks include private networks, such as local area networks (LANs) or wide area networks (WANs), and public networks, such as the Internet. Private networks are networks in which access is restricted to authorized users, while public networks are generally accessible.

To prevent unauthorized access or interception of data communicated over data networks, various security protocols have been implemented to allow for encryption of data and authentication of sources of data. One such security protocol is the Internet Protocol Security (IPsec) protocol, which provides for secure communications over data networks.

One application of secure communications over data networks is to enable virtual private networks (VPNs). A VPN includes a public network as the primary transport medium, with communications protected by a security protocol. Access to a private network (such as a corporate LAN) from a remote location (such as from a branch office or by a remote user) is often desirable. Rather than using direct dial-up or dedicated point-to-point lines that are relatively expensive to maintain, a VPN between two endpoints (one endpoint being the LAN and the other endpoint being the remote terminal) can be established to provide secure communications over a public network. By using a VPN, a secure, convenient, and cost-effective mechanism is provided for users who desire to remotely access a private network.

Although IPsec provides a robust security mechanism to protect communications between two endpoints, IPsec does not provide for a mechanism to determine if the link between the two endpoints is functioning properly. In other words, IPsec does not provide for a keep-alive mechanism. Thus, for example, nodes connected over a VPN may assume that the VPN connection is still valid even though the VPN may be down. As a result, reliable communications over the VPN may not be possible or may be delayed due to the time needed to re-establish a connection.

SUMMARY

In general, according to one embodiment, a method of determining if a link is alive comprises establishing a secure link between a first node and a second node according to a security protocol and sending at least one ping message to the second node over the secure link. The ping message is defined outside the security protocol. At least one ping reply is monitored for to determine if the secure link is alive.

In general, according to another embodiment, a method of communicating with a remote node comprises establishing a secure link between a first security gateway and a second security gateway, the remote node being in communication with the second security gateway. At least one ping message is sent to the remote node over the secure link and through the second security gateway. At least one ping reply from the remote node is monitored to determine if the secure link is alive.

Some embodiments of the invention may have one or more of the following advantages. A more reliable mechanism is provided to detect when a link protected by a security mechanism has failed, is down, or is otherwise unavailable. By identifying this unavailable condition, the link between the nodes may be terminated and re-established as necessary. Reliability of communications over a link protected by a security mechanism is improved.

Other or alternative features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
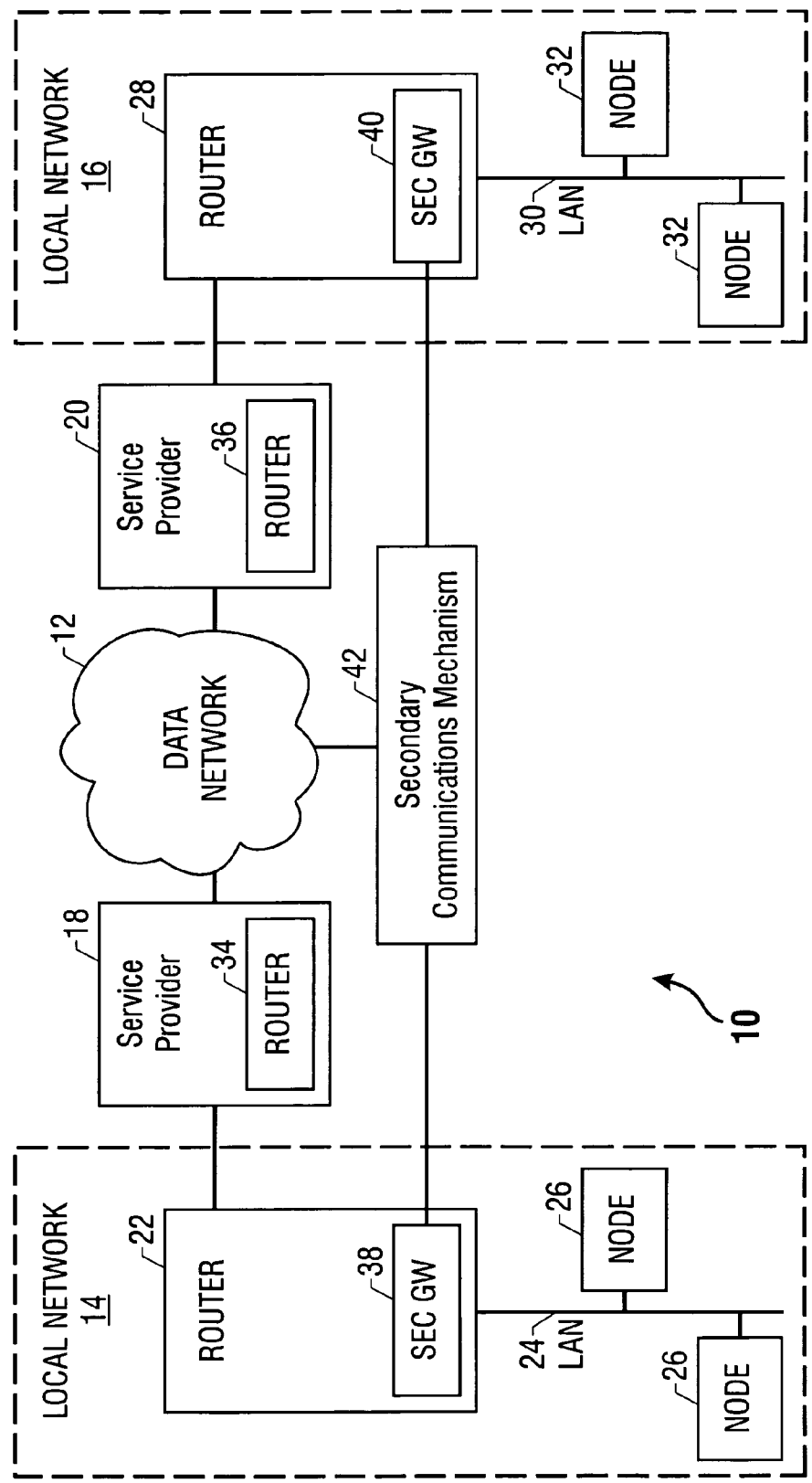
FIG. 1 is a block diagram of an embodiment of a communications system.

Referring to FIG. 1, a communications system 10 includes a data network 12 that is coupled to a first local network 14 and a second local network 16 through respective service provider systems 18 and 20 (including respective routers 34 and 36). In one arrangement, the data network 12 is a public network, such as the Internet. One protocol that can be employed for communications over the data network 12 is the Internet Protocol (IP). One version of IP is described in Request for Comments (RFC) 791, entitled "Internet Protocol," dated September 1981; and another version of IP is described in RFC 2460, entitled "Internet Protocol, Version 6 (IPv6) Specification," dated December 1998. In other embodiments, other packet-based protocols may be employed for communications over the data network 12.

The local network 14 includes a router 22 that is connected to a local area network (LAN) 24. The LAN 24 is tied to a number of nodes 26. In one arrangement, the LAN 24 is an Ethernet network as defined by the Institute of Electrical and Electronic Engineers (IEEE) 802.3 Standard. In other embodiments, the LAN 24 may be a wireless LAN. Alternatively, instead of a LAN, the nodes 26 may be coupled over a wide area network (WAN) to the router 22.

The other local network 16 similarly includes a router 28, a LAN or WAN 30, and nodes 32 coupled to the LAN or WAN 30. Examples of nodes 26 and 32 include computer systems, network telephones, Internet appliances, and other devices or systems. In one example arrangement, the local network 16 is the main office network while the local network 14 is the branch office network. In another example arrangement, instead of the local network 14, a remote user system (such as one associated with a traveling user or a home user) is able to access the ISP system 18 directly through a dial-up connection. If access of the data network 12 from one of the nodes 26 or 32 is requested, the respective router 22 or 28 establishes a connection with a respective service provider system 18 or 20. Once a connection between the router 22 or 28 and respective service provider system 18 or 20 is established, the node 26 or 32 is able to communicate over the data network 12. Examples of such communications include electronic mail, web browsing, file downloads, text chat sessions, voice or other real-time, interactive communications, and so forth.

For secure communications between the local networks 14 and 16, a virtual private network (VPN) can be established over the data network 12. The transport medium of the VPN is a public network such as the data network 12, with a security protocol employed to protect communications between endpoints of the VPN. In the illustrated example, the security endpoints are the routers 22 and 28, which include respective security gateways 38 and 40. In the arrangement where a remote user system is connected directly to the ISP system (without going through a router), the security gateway is implemented in the remote user system.

Thus, a "link" protected by a security mechanism can be established between the nodes containing security gateways. As used here, a "link" refers to one or more communications channels between two nodes. Such communications channels can be interconnected by routers, bridges, or other devices. A link protected by a security mechanism can also be referred to as a "secure link."

In one embodiment, the security gateways 38 and 40 implement the Internet Protocol Security (IPsec) protocol, described in part by RFC 2401, entitled "Security Architecture for the Internet Protocol," dated November 1998. Under IPsec, an Internet Security Association and Key Management Protocol (ISAKMP) defines procedures and packet formats to establish, negotiate, and provide security services between network entities. Once the desired security services have been negotiated between two entities, such as the security gateways 38 and 40, traffic is carried in IP Encapsulating Security Payload (ESP) packets. In another arrangement, security services are negotiated between a remote user system and the router 28. During a secure communications session, transmitted data is encrypted and authentication of endpoints in the session is performed. ISAKMP is described in RFC 2408, entitled "Internet Security Association and Key Management Protocol (ISAKMP)," dated November 1998; and ESP is described in RFC 2406, entitled "IP Encapsulating Security Payload (ESP)," dated November 1998. In other embodiments, other types of security protocols may be employed for establishing secure communications over the data network 12.

Under IPsec, encryption and authentication algorithms are determined based on a security association (SA) of an IP packet. An SA indicates the types of security services that are associated with the IP packet. An SA is defined by the destination address carried in the IP packet as well as a security parameters index (SPI) of an ESP message (in which an IP packet is embedded).

To establish a secure communications session or secure link between two nodes, the two nodes perform IPsec negotiation. IPsec negotiation involves the establishment of an SA. ISAKMP provides the protocol exchanges to establish an SA between negotiating entities, with the IPsec negotiation specifying the authentication method and key exchange to be used as part of the ISAKMP protocol. The established SA specifies the relationship between the two nodes (or more than two nodes) that describe how the nodes will use security services to communicate securely over the secure link. After the SA has been determined, a secure link (such as a VPN session) is established.

IPsec, however, does not provide for a keep-alive mechanism that enables two security gateways to determine if a secure link between the endpoints is alive. This may occur when a router (22 or 28) containing one of the security gateways reboots or experiences a crash or fault condition. In the example arrangement of FIG. 1, when a router reboots, it has to re-establish a connection with the respective service provider system (18 or 20). In re-establishing the connection, the router may be assigned a new address (e.g., IP address). This may occur if the respective service provider system implements either a DHCP (Dynamic Host Configuration Protocol) or IPCP (Internet Protocol Control Protocol) mechanism, which enables dynamic assignment of IP addresses. DHCP is described in RFC 1541, entitled "Dynamic Host Configuration Protocol," dated October 1993; and IPCP is described in RFC 1332, entitled "The PPP Internet Protocol Control Protocol (IPCP)," dated May 1992.

Since an SA is based in part on the IP addresses of the routers 22 and 28, a change in IP addresses of one of the routers will render the SA invalid. If the SA becomes invalid, then the secure link is no longer "alive" or valid. Under IPsec, a security gateway may be unaware of the invalid status of the secure link, which makes communications over the secure link unreliable. An IPsec SA expires after a predetermined period of time (e.g., eight hours). After expiration of the security association, automatic recovery of the link can occur. However, the time needed for such automatic recovery is usually unacceptably large.

In accordance with some embodiments of the invention, a keep-alive mechanism is implemented in each of the nodes (e.g., routers 22 and 28) coupled by a secure link protected by a security mechanism to enable the nodes to determine if the link is alive. Since IPsec does not provide for a keep-alive mechanism, a keep-alive mechanism defined outside of the IPsec protocol is employed.

A keep-alive mechanism according to some embodiments employs "ping" messages sent by one of the nodes coupled to the secure link to the peer node. To validate the secure link, the ping messages are sent over secure link (that is, the ping messages are sent through the tunnel established by the secure link). Thus, the ping messages themselves are encrypted according to the SA established for the secure link and carried in the payload of IP packets for communication to the peer node.

Whether the secure link is alive (e.g., whether an IPsec SA is valid) is determined based on responses to the ping messages. In one embodiment, a ping message can be according to the Internet Control Message Protocol (ICMP), as described in RFC 792, entitled "Internet Control Message Protocol," dated September 1981. The ping message may be an ICMP echo message. An ICMP echo message specifies the source address (the address of the node sending the echo message) and the destination address (the address of the target node). In response to an ICMP echo message, the receiving node returns an ICMP reply message, in which the source and destination addresses are switched. The echo message also carries data, which is returned in the echo reply message. To enable matching of an echo reply message to an echo message, identifier and sequence fields are contained in the messages. Thus, in this embodiment, one or more ICMP echo messages are transmitted periodically by a router to a destination over a secure link. If the link is alive, then the destination returns ICMP echo reply messages.

In other embodiments, other types of ping messages can be communicated over the data network 12 to determine if a link is alive. Thus, generally, on a secure link between two nodes that is protected by a security protocol, one or more ping messages may be communicated over the secure link to determine if the link is alive, with the ping messages defined outside the security protocol. For example, if the security protocol is IPsec, then the ping messages defined outside IPsec include ICMP messages. Thus, a benefit offered by some embodiments of the invention is the ability to implement a keep-alive mechanism in a secure link protected by a security protocol that does not provide for a mechanism to determine if a link is alive.

In another aspect of the invention, by using certain types of ping messages, such as ICMP messages, the ping messages can be targeted at nodes that are behind a security gateway. Thus, in the communications system of FIG. 1, instead of just being able to determine if a link between two peer nodes containing security gateways is alive, mechanisms according to some embodiments are able to determine if the link between a first security gateway and a node coupled behind a second security gateway is alive. As used here, a node is said to be "behind" a security gateway if communications between the node and an external device has to go through the security gateway. Thus, in the example of FIG. 1, the first router 22 can send ping messages through the data network 12 and the security gateway 40 to one of the nodes 32. In response to the ping messages, the node 32 returns a ping reply through the router 28 and data network 12 to the first router 22.

In the illustrated arrangement, an optional secondary communications mechanism 42 is also provided between the routers 22 and 28 as a redundant path if the primary path through the data network 12 becomes unavailable. Thus, for example, if the keep-alive mechanism according to some embodiments detects that a secure link is down, the secondary communications mechanism 42 can be used for communications between the routers 22 and 28. In one embodiment, the secondary communications mechanism 42 includes a WAN.

Figure 2:
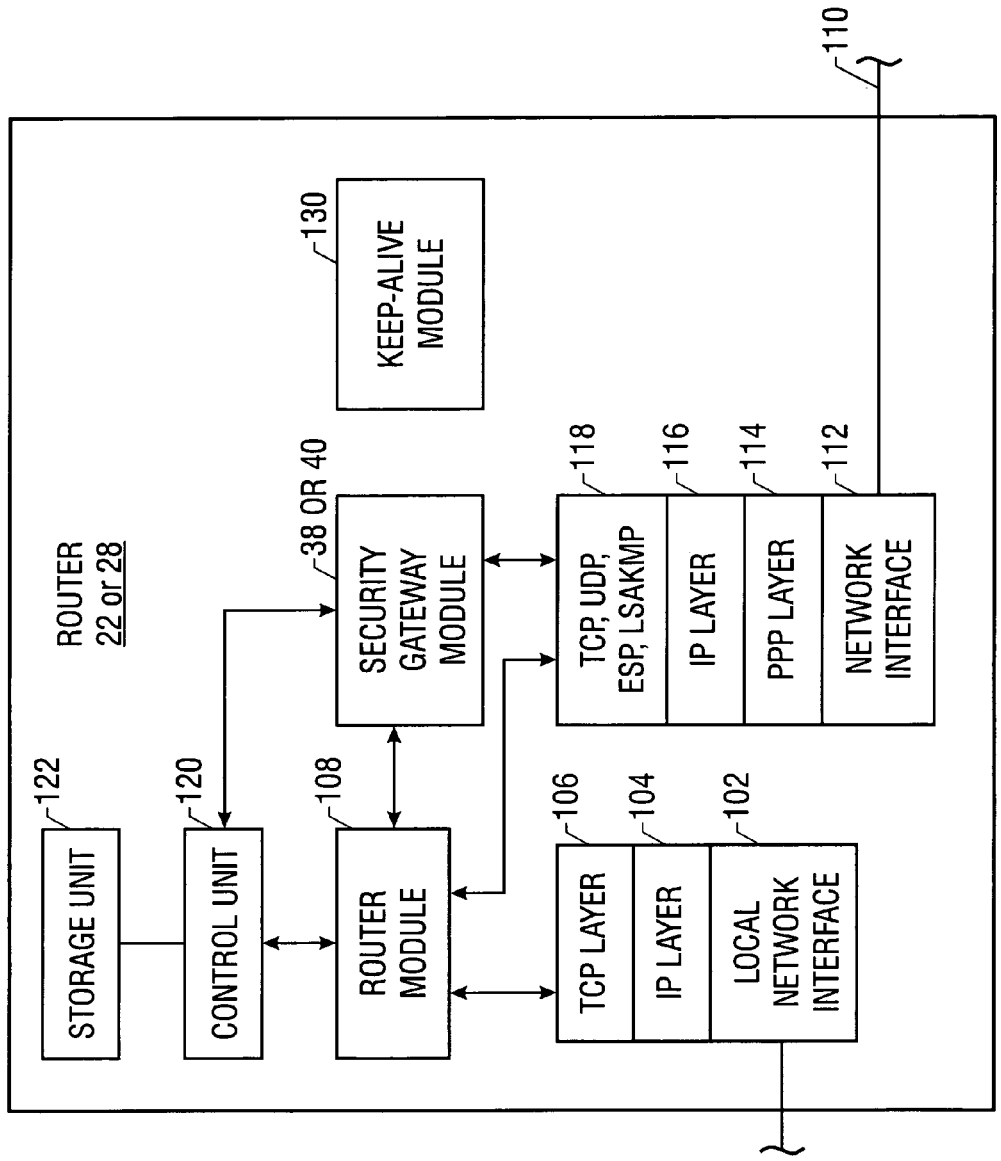
FIG. 2 is a block diagram of components in a router that is used in the communications system of FIG. 1, the router including a security gateway and a keep-alive module in accordance with some embodiments.

Referring to FIG. 2, components of the router 22 or 28 in one example arrangement are illustrated. The router 22 or 28 includes a local network interface 102 that provides an interface to LAN 24 or 30. In one embodiment, the local network interface 102 includes Ethernet functions to enable communications over an Ethernet network. Inbound and outbound messages are passed through the local network interface 102 as well as an IP layer 104 and a Transmission Control Protocol (TCP) layer 106. TCP is a transport layer that manages connections over an IP networks, and is described in RFC 793, entitled "Transmission Control Protocol," dated September 1981.

A router module 108 provides routing tasks for messages communicated between the LAN 24 or 30 and an external network 110 coupled through an external network interface 112. The external network 110 is the network or link to an access system (shown in FIGS. 7A and 7B) that couples the router 22 or 28 to the ISP system. Inbound and outbound messages associated with the external network 110 are passed through the network interface 112, a point-to-point (PPP) layer 114, an IP layer 116, and a layer 118 that includes TCP, UDP (User Datagram Protocol), ESP, and ISAKMP functions. UDP is another type of transport layer, and is described in RFC 768, entitled "User Datagram Protocol," dated August 1980. PPP, as described in RFC 1661, entitled "The Point-to-Point Protocol (PPP)," dated July 1994, provides a standard method for transporting multi-protocol packets over point-to-point connections. In this case, the point-to-point connection is between the router 22 or 28 and the access system that provides the access to the router 34 or 36 in the ISP system 18 or 20. In other embodiments, the PPP layer 114 can be omitted if point-to-point connections are not used. The layers 112, 114, 116, and 118 are part of a protocol stack.

The router module 108 can be a software module that is executable on a control unit 120 connected to a storage unit 122. Alternatively, the router module 108 can be a hardware component, such as one implemented as a programmable gate array (PGA), application-specific integrated circuit (ASIC), microcontroller, or other type of hardware control component.

The router 22 or 28 also includes the security gateway module 38 or 40 for establishing secure sessions, such as IPsec sessions. The security gateway module 38 or 40 can be a software module executable on the control unit 120, or alternatively, the security gateway module 38 or 40 can be implemented in hardware. Another module in the router 22 or 28 is a keep-alive module 130 capable of sending ping messages through the protocol stack to the external network 110 and over the data network 12 (FIG. 1). The security gateway module 38 or 40 and the keep-alive module 130 can be implemented within a single module or as separate modules (as shown).

Figure 3:
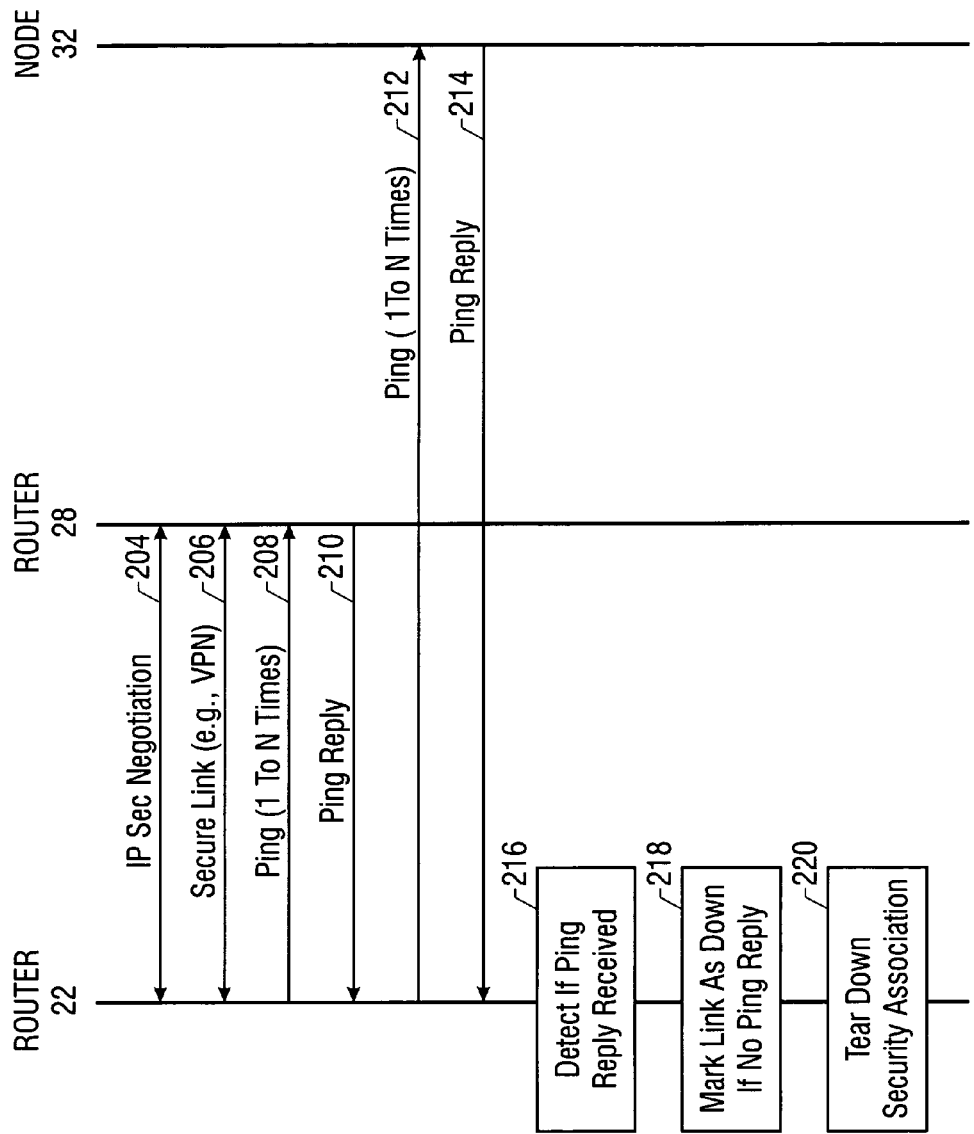
FIG. 3 is a message flow diagram of messages exchanged between, and acts performed by, first and second routers and a network node.

Referring to FIG. 3, a node 32 (that is part of the local network 16) sends a request to the router 28 for access to the data network 12. In response, the security gateway 40 in the router 28 performs an IPsec negotiation (at 204) with the remote security gateway 38 in the router 22. When the negotiation is complete, a secure link is established (at 206) between the security gateways 38 and 40. The secure link is associated with an SA.

Figure 4:
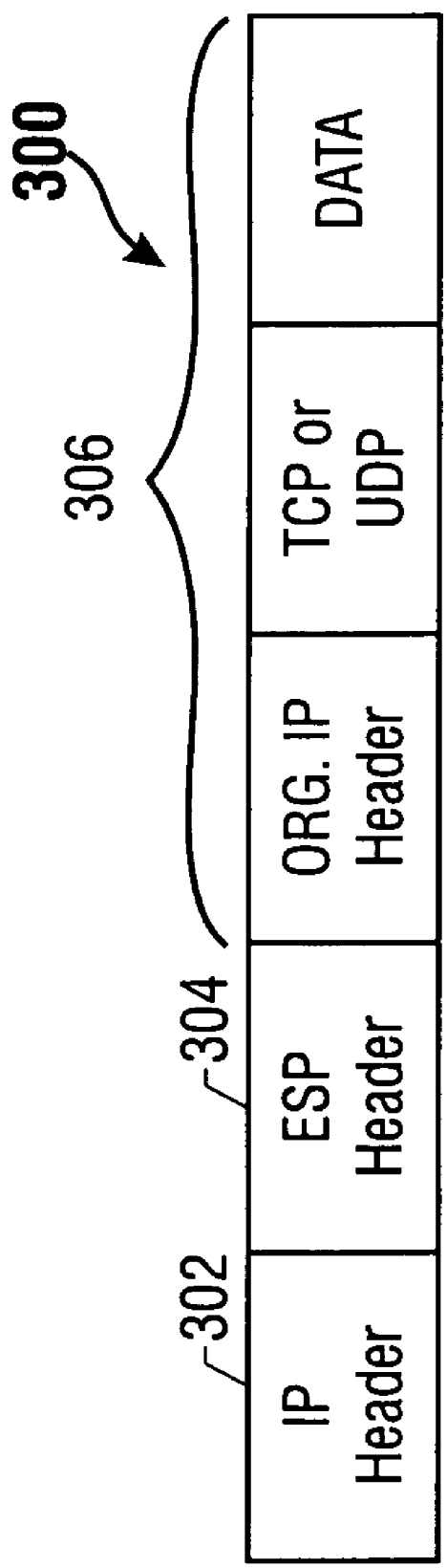
FIG. 4 illustrates a message according to an Internet Protocol Security (IPsec) protocol that can be exchanged between the first and second routers of FIG. 3.

As shown in FIG. 4, an example message that is exchanged in the secure communications session is illustrated. FIG. 4 shows an IP packet 300 that includes an IP header 302, an ESP header 304, and a protected payload section 306. The protected payload section 306 contains the original IP header, TCP or UDP port numbers, and the data payload. The IP header 302 includes a source address, a destination address, and a protocol identifier to indicate the next level protocol that is used (e.g., TCP, UDP, or ESP). The payload section 306 is protected by encryption. In other embodiments, other formats for IP packets protected by a security protocol may be employed.

Referring again to FIG. 3, in accordance with some embodiments of the invention, the keep-alive module 30 in the router 22 sends periodic ping messages (at 208) to the peer router 28. Ping messages can also be sent in the other direction, from the keep-alive module 130 in the router 28 to the router 22. Each ping message is carried in the encrypted payload section 306 of the IP packet 300 (FIG. 4).

As indicated in FIG. 3, the ping message can be sent N times, with N being greater than or equal to one. With each ping message, the keep-alive module 130 in the router 22 monitors for a ping reply that is sent (at 210). Each keep-alive module 130 can be associated with three parameters: a ping interval parameter to indicate the frequency at which ping messages are periodically sent; a timeout parameter to indicate how long to wait for a reply to each ping message; and a number of failures parameter to indicate how many non-responses to ping messages can be tolerated before a secure link is indicated as being down.

Alternatively, or in addition to the ping message sent at 208, the keep-alive module 130 in the router 22 can also send ping messages (at 212) to the node 32, which sits behind the security gateway 40 in the router 28. Thus, in accordance with some embodiments, the keep-alive module 130 has flexibility in the target that the keep-alive module 130 pings. The keep-alive module 130 in the router 22 then monitors (at 214) for a ping reply from the node 32.

The keep-alive module 130 in the router 22 detects (at 216) if one or more ping replies were received from the target network element. If no ping reply was received, or if there were greater than a predetermined number of non-responses, then the keep-alive module 130 indicates to the corresponding security gateway 38 (at 218) that the secure link between the routers 22 and 28 is down. If the secure link is down, the security gateway 38 then tears down (at 220) the secure link between the security gateways 38 and 40 by destroying the SA of the secure link. If desired, the secure link can then be re-established by performing another IPsec negotiating to derive a new SA.

Figure 5:
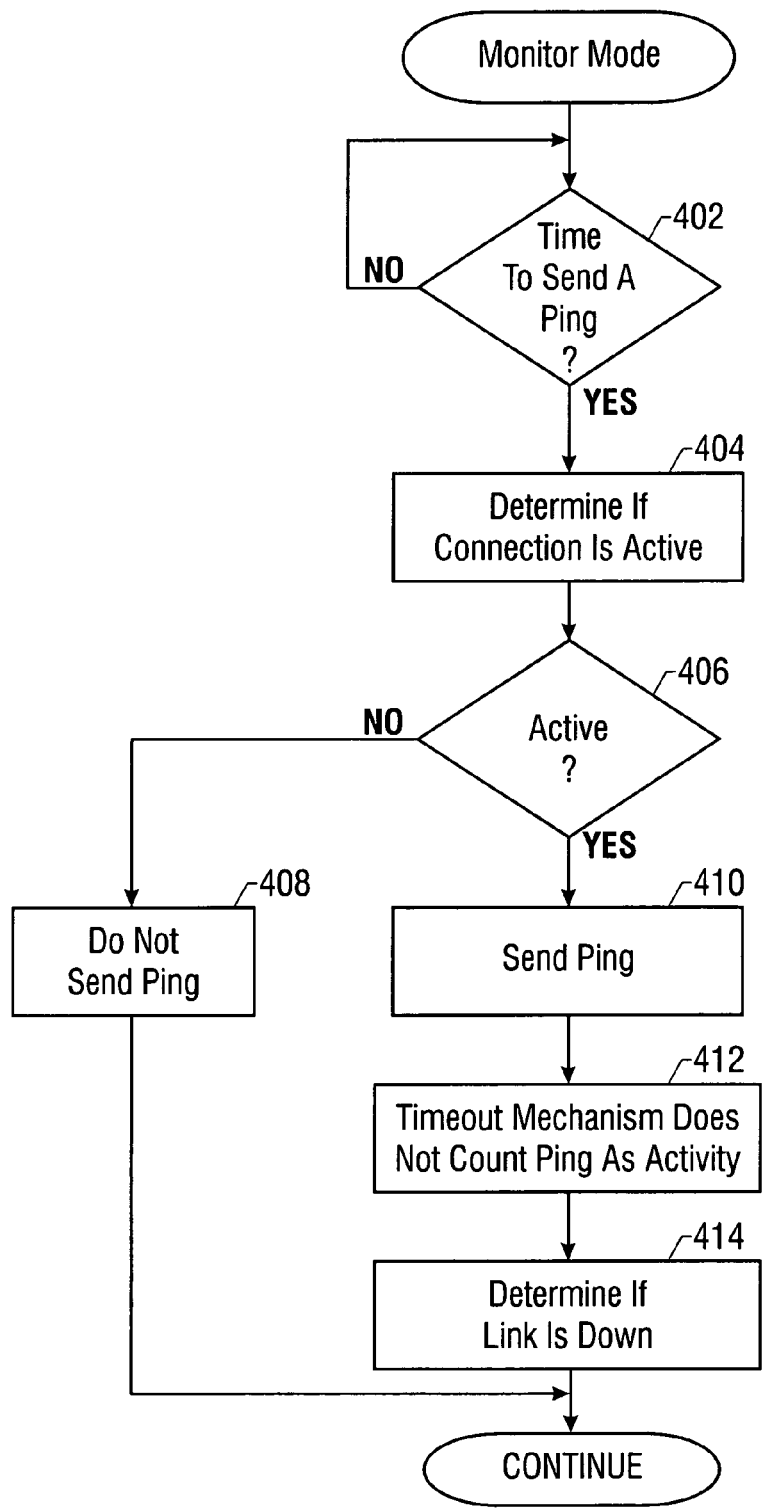
FIG. 5 is a flow diagram of a process performed by one of the first and second routers of FIG. 3 in a first mode.
Figure 6:
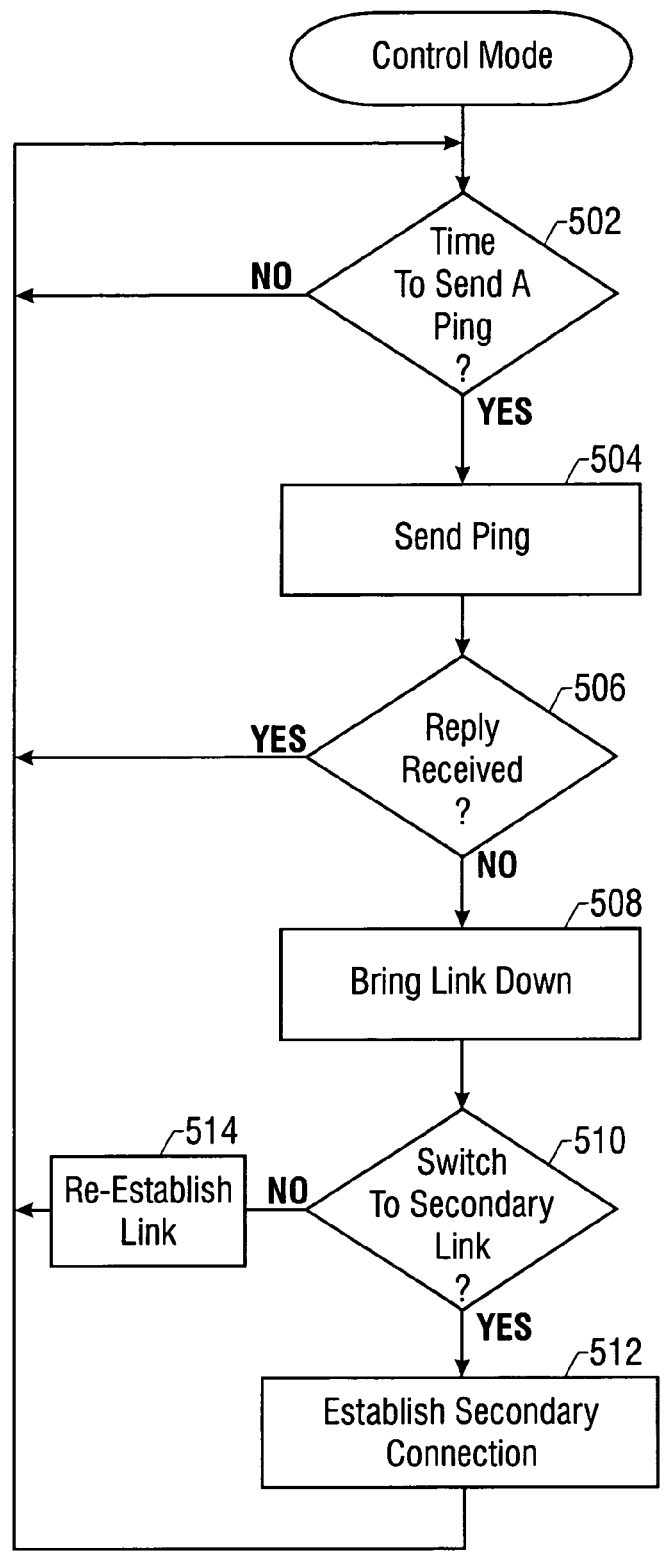
FIG. 6 is a flow diagram of a process performed by one of the first and second routers of FIG. 3 in a second mode.

Referring to FIGS. 5 and 6, the keep-alive module 130 can be in one of two different modes: monitor mode and control mode. Monitor mode can be used for connections between the router 22 or 28 and an access system that is not permanent in nature, such as an analog dial-up connection or an Integrated Services Digital Network (ISDN) dial-up connection. In such connections, tariffs imposed by the local exchange carrier may discourage maintaining permanent connections between the router 22 or 28 and the associated service provider 18 or 20 through the access system. On the other hand, where permanent connections between the router 22 or 28 and the service provider through the access system is available, such as when an xDSL (digital subscriber line) or cable modem is employed, then the keep-alive module 130 may be set in the control mode, which is designed to maintain permanent connections if possible.

Referring to FIG. 5, an example of operations performed in monitor mode is shown. The keep-alive module 130 in the router (22 or 28) first determines if it is time to send a ping message (at 402). Next, the router determines if a connection to the respective service provider system is active (at 404). In a dial-up or other demand connection environment, a timeout mechanism may be employed in the router to deactivate the link after a certain period of inactivity.

If the connection is determined (at 406) to be not active, then a ping message is not sent (at 408) to avoid establishing a connection. However, if the connection is active, ping message (or plural ping messages) are sent (at 410). However, the one or more ping messages are not considered by the timeout mechanism in the router as being activity, so that the timeout mechanism is not reset in response to communication of a ping message (412). Based on responses (or lack thereof) to the transmitted one or more ping messages, the router determines (at 414) if the secure link is down.

Referring to FIG. 6, an example operation in the control mode is illustrated. The keep-alive module 130 in the router first determines if it is time to send a ping message (at 502). If so, the ping message (or multiple ping messages) are sent (at 504). The keep-alive module 130 in the router then determines (at 506) if a reply has been received. If a reply is not received, or if greater than a predetermined number of non-responses have been detected, then the secure link is brought down (at 508). The router also determines (at 510) whether to switch to a secondary link, such as a link through the secondary communications mechanism 42 (FIG. 1). If switching to the secondary link is desired, then a link is established (at 512) over the secondary communications mechanism. However, if switching to the secondary communications mechanism 42 is not to be performed, then the router can attempt to re-establish (at 514) the secure link over the primary path (which includes the data network 12).

Before re-establishing the secure link over the data network 12, the router continues to send ping messages. Thus, even if a connection is considered down for normal traffic, communication of ping messages can still be attempted. If a successful ping reply is received, then the security association between the two peer security gateways can be established again to provide for a secure link. By first checking to ensure that a connection is active before establishing a new secure link, unnecessary attempts of performing IPsec negotiations can be avoided.

Figure 7A:
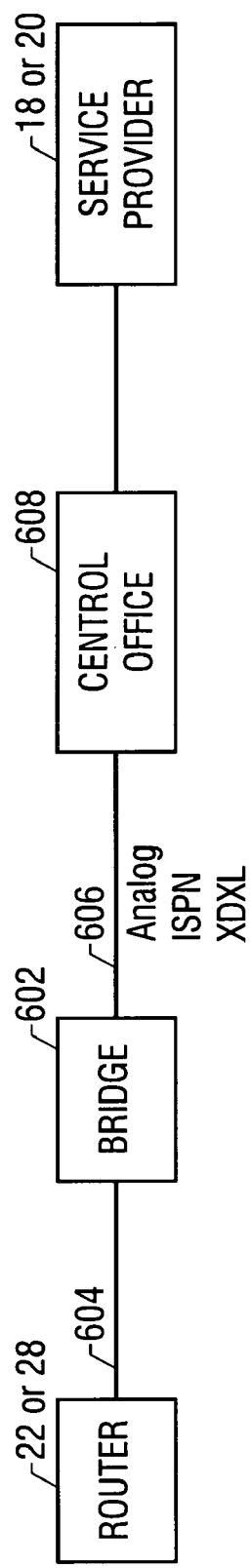
FIGS. 7A–7B illustrate example communications links between a router and an Internet service provider (ISP) system.
Figure 7B:
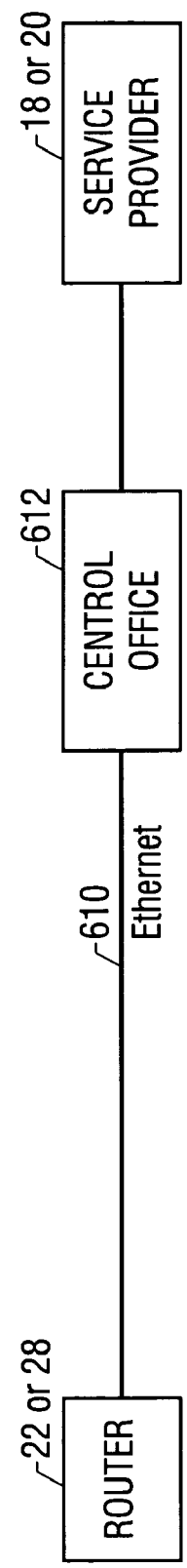

Referring to FIGS. 7A and 7B, some example embodiments of the connections between the router 22 or 28 and the service provider system 18 or 20 are illustrated. In the FIG. 7A embodiment, a bridge 602 is connected to the router 22 or 28 over a channel 604. The channel 604 may be an Ethernet channel in one example. The bridge 602 translates data on the link 604 to a format of another channel 206 that is connected to the other side of the bridge 602. Examples of the channel 606 include an xDSL channel, an ISDN channel, an analog dial-up channel, or another type of channel. The channel 606 is coupled to central office equipment 608 provided by a local exchange carrier (LEC), which is usually a telephone company. The central office equipment 608 is in turn coupled to the service provider system 18 or 20. Alternatively, the service provider system 18 or 20 may be part of the central office 608. In the FIG. 3A embodiment, the access system includes the bridge 602 and the central office equipment 608.

In FIG. 7B, another arrangement is shown in which a channel 610 between the router 22 or 28 and central office equipment 212 (the access system) is an Ethernet channel. In this embodiment, a bridge is not needed between the router and the central office equipment 612. In either the FIG. 7A or 7B embodiment, a point-to-point connection is established between the router and the central office equipment.

Instructions of the various software routines or modules discussed herein may be stored on one or more storage units in the corresponding nodes and loaded for execution on corresponding control units. The control units include microprocessors, microcontrollers, processor cards (including one or more microprocessors or microcontrollers), or other control or computing devices. As used here, a "controller" refers to hardware, software, or a combination thereof. A "controller" can be made up of one component or plural components.

The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact disks (CDs) or digital video disks (DVDs). Instructions that make up the various software routines or modules in a node and stored in a respective storage unit when executed by a control unit cause the corresponding node to perform programmed acts.

The instructions of the software routines or modules are loaded or transported into the node in one of many different ways. For example, code segments including instructions stored on floppy disks, CD or DVD media, a hard disk, or transported through a network interface card, modem, or other interface device may be loaded into the node and executed as corresponding software routines or modules. In the loading or transport process, data signals that are embodied in carrier waves (transmitted over telephone lines, network lines, wireless links, cables, and the like) may communicate the code segments, including instructions, to the node. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of determining if a link is alive, comprising:
    establishing a secure link between a first node and a second node according to a security protocol;
    sending at least one ping message targeting the second node over the secure link, the at least one ping message defined outside the security protocol; and
    monitoring for at least one ping reply to determine if a security association of the secure link is valid,
    wherein sending the at least one ping message comprises sending at least one Internet Control Message Protocol message.

2. A system for communicating between a network element and a remote node, comprising:
    a security module adapted to establish a secure link with the remote node, the secure link having a security mechanism according to a security protocol; and
    a keep-alive module adapted to send at least one ping message over the secure link to the remote node, the at least one ping message defined outside the security protocol,
    wherein the at least one ping message comprises an Internet Control Message Protocol message;
    wherein the keep-alive module is adapted to further monitor for at least one ping reply responsive to the at least one ping message to determine if a security association of the secure link is valid.

3. A system for communicating between a network element and a remote node, comprising:
    a security module adapted to establish a secure link with the remote node, the secure link having a security mechanism according to a security protocol; and
    a keep-alive module adapted to send at least one ping message over the secure link to the remote node, the at least one ping message defined outside the security protocol,
    wherein the at least one ping message is protected according to the security protocol,
    wherein the keep-alive module is adapted to further monitor for at least one ping reply responsive to the at least one ping message to determine if a security association of the secure link is valid, the system further comprising a module adapted to establish a link over a secondary communication network if security association of the secure link is not valid.

4. The system of claim 3, further comprising:
    an interface to a packet-based network, the secure link established over the packet-based network; and
    a layer to control communications over the packet-based network.

5. The system of claim 4, wherein the layer comprises an Internet Protocol layer.

6. The system of claim 3, wherein the security module is adapted to tear down the security association of the secure link if the secure link is not alive.

7. The system of claim 6, wherein the security association comprises an Internet Protocol Security protocol security association.

8. The system of claim 3, wherein the security protocol comprises an Internet Protocol Security protocol (IPsec), and wherein the at least one ping message is encrypted according to an IPsec security association.

9. A method comprising:
    establishing a secure link between a first node and a second node according to an Internet Protocol Security (IPsec) protocol;
    sending at least one ping message targeting the second node over the secure link, the at least one ping message defined outside the IPsec protocol; and
    monitoring for at least one ping reply to determine if an IPsec security association of the secure link is valid,
    wherein sending the at least one ping message comprises sending the at least one ping message protected according to the IPsec protocol.

10. The method of claim 9, wherein establishing the secure link comprises establishing a virtual private network session.

11. The method of claim 9, wherein sending the at least one ping message comprises sending at least one Internet Control Message Protocol message.

12. The method of claim 9, wherein establishing the secure link comprises establishing the secure link between first and second nodes each comprising a security gateway.

13. The method of claim 12, further comprising sending at least one ping message targeting another node connected to a network behind the second node.

14. The method of claim 13, further comprising monitoring for at least one ping reply from the other node.

15. The method of claim 9, further comprising tearing down the secure link if the IPsec security association is determined not to be valid.

16. The method of claim 15, wherein tearing down the secure link comprises tearing down the IPsec security association.

17. A method of communicating with a remote node, comprising:
    establishing a secure link between a first security gateway and a second security gateway, the remote node in communication with the second security gateway over a network separate from the secure link;

sending at least one ping message to the remote node over the secure link, through the second security gateway, and over the network; and monitoring for at least one ping reply from the remote node to determine if a security association of the secure link is valid, wherein establishing the secure link comprises establishing a secure link protected according to a security protocol, wherein sending the at least one ping message comprises sending at least one ping message defined outside the security protocol, wherein sending the at least one ping message comprises sending the at least one ping message protected according to the security protocol.

18. The method of claim 17, wherein establishing the secure link comprises establishing a secure link protected according to an Internet Protocol Security protocol.

19. The method of claim 17, wherein establishing the secure link comprises establishing a virtual private network session.

20. The method of claim 17, wherein sending the at least one ping message comprises sending an Internet Control Message Protocol message.

21. The method of claim 20, wherein establishing the secure link comprises establishing a secure link protected according to an Internet Protocol Security protocol.

22. The method of claim 17, wherein the security protocol comprises an Internet Protocol Security protocol (IPsec), and wherein sending the at least one ping message comprises sending the at least one ping message encrypted according to an IPsec security association.

23. An article comprising at least one storage medium containing instructions for controlling communications, the instructions when executed causing a controller to:

establish a secure link between a first node and a second node according to a security protocol;

send at least one ping message targeting the second node over the secure link, the at least one ping message defined outside the security protocol; and monitor for at least one ping reply to determine if a security association of the secure link is valid, wherein sending the at least one ping message comprises sending the at least one ping message protected according to the security protocol.

24. The article of claim 23, wherein the instructions when executed cause the controller to further establish an Internet Protocol security association for the secure link.

25. The article of claim 24, wherein the instructions when executed cause the controller to tear down the security association if the controller does not receive the at least one ping reply.

26. The article of claim 23, wherein the controller is part of the first node.

27. The article of claim 23, wherein the security protocol comprises an Internet Protocol Security protocol (IPsec), wherein the security association of the secure link comprises an IPsec security association, and wherein sending the at least one ping message comprises sending the at least one ping message encrypted according to the IPsec security association.

* * * * *